United States Patent Office 2,755,175
Patented July 17, 1956

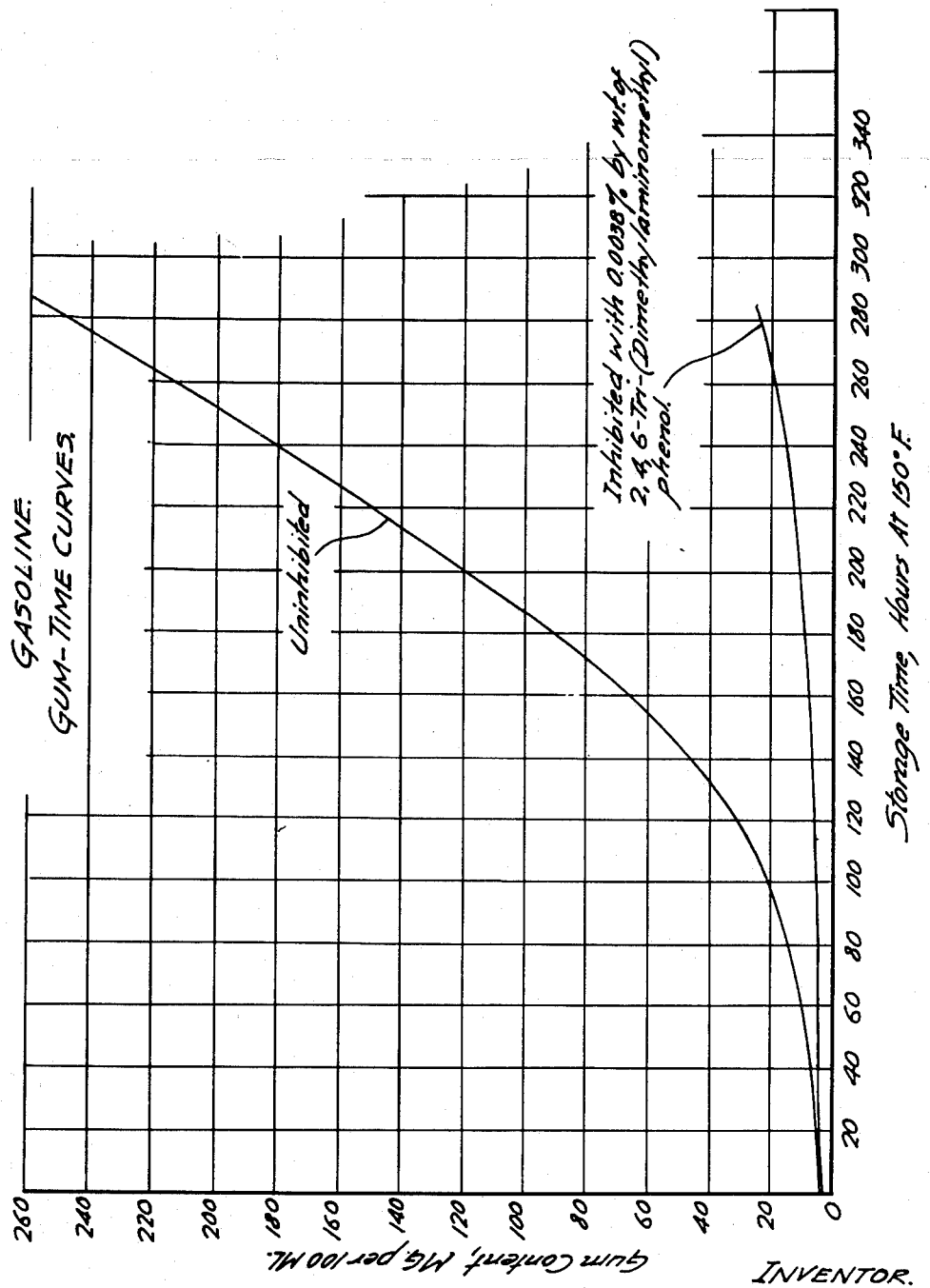

2,755,175

GASOLINE CONTAINING 2,4,6-TRI-(DIMETHYL-AMINOMETHYL) PHENOL

Elizabeth L. Fareri, Pittsburgh, Pa., assignor to Gulf Research & Development Company, Pittsburgh, Pa., a corporation of Delaware Application October 14, 1952, Serial No. 314,684

3 Claims. (Cl. 44—75)

This invention relates to improved gasolines and, more particularly, to gasoline containing a small amount of antioxidant for preventing or suppressing discoloration and the formation of gummy substances during storage or use.

Cracked gasolines, polymer gasolines and blends containing these gasolines are unstable and tend to undergo deterioration over a period of time. This difficulty is believed to be due to the presence in the gasoline of certain undesirable constituents which are subject to oxidational changes and result in the formation of gums and color-imparting bodies. Gasolines containing these undesirable constituents while in contact with air, on standing and/or in use, form non-volatile resinous or gummy substances which are highly objectionable. The resinous or gummy substances tend to deposit out of the gasoline and form coatings in feed lines, parts of carburetors, valves, valve stems, etc., with the result that the gasoline retains little value as a motor fuel.

I have found that by the addition of relatively small amounts of 2,4,6-tri - (dimethylaminomethyl) phenol to cracked gasolines, polymer gasolines and blends containing these gasolines, the afore-mentioned gum formation can be very appreciably inhibited and the foregoing difficulties virtually eliminated.

The antioxidant property of 2,4,6 - tri - (dimethylaminomethyl) phenol in gasoline is shown in the following series of tests for three different thermally cracked gasolines as indicated below in Table I.

Table I

TEST A

| Additive | Weight Percentage | Induction period, minutes |
|---|---|---|
| (1) Blank | | 231 |
| (2) 2,4,6-tri-(dimethylaminomethyl) phenol | 0.0724 | 940 |

TEST B

| (1) Blank | | 151 |
|---|---|---|
| (2) 2,4,6-tri-(dimethylaminomethyl) phenol | 0.0724 | 747 |
| (3) 2,4,6-tri-(dimethylaminomethyl) phenol | 0.0362 | 430 |
| (4) 2,4,6-tri-(dimethylaminomethyl) phenol | 0.0181 | 355 |

TEST C

| (1) Blank | | 132 |
|---|---|---|
| (2) 2,4,6-tri-(dimethylaminomethyl) phenol | 0.0362 | 416 |
| (3) 2,4,6-tri-(dimethylaminomethyl) phenol | 0.0724 | 726 |

Each of Tests A, B and C above was run in accordance with A. S. T. M. Test of Oxidation Stability of Gasoline D525–49. The method consists, briefly, in oxidizing the sample in a bomb initially filled at 59° to 77° F. with oxygen at 100 pounds per square inch and heated at a temperature between 208° and 216° F. The pressure is read at stated intervals or recorded continuously until the break point is reached, which is the point in the pressure-time curve that is preceded by a pressure drop of exactly two pounds per square inch within fifteen minutes and succeeded by a drop of not less than two pounds per square inch in fifteen minutes. The length of time of heating until a sharp reduction in oxygen pressure is obtained (due to oxidation reactions in the gasoline) is called the induction period and is generally recognized in the art to be indicative of the gum stability of the gasoline under test.

It will be noted from Test B that 2,4,6-tri-(dimethylaminomethyl) phenol when present in amounts as low as 0.018 per cent by weight more than doubles the length of the induction period of uninhibited gasoline. While I may use 2,4,6-tri-(dimethylaminomethyl) phenol in amounts as low as 0.001 per cent by weight and still obtain satisfactory results, in general I prefer to use 2,4,6-tri-(dimethylaminomethyl) phenol in an amount of at least 0.002 per cent by weight.

In order to further show the effectiveness of 2,4,6-tri-(dimethylaminomethyl) phenol as an antioxidant in inhibiting or suppressing the formation of gummy or resinous materials in gasoline, I have run accelerated storage tests on two samples of gasoline identical except that one sample contained 0.0038 per cent by weight of 2,4,6-tri-(dimethylaminomethyl) phenol, while the other was uninhibited. The gasoline used in this test was a redistilled blend, comprising 50 volume per cent catalytic stock, 25 volume per cent thermal distillate and 25 volume per cent straight run distillate.

The uninhibited and inhibited fuels were stored separately at a temperature of 150° F. in glass containers, held in sealed bombs, which were initially filled at a temperature of about 40° F. at atmospheric air pressure, with the air-liquid fuel ratio in the bomb being 3.6:1 at filling time. The bombs were preheated, admitted to 150° F. constant temperature bath, and at certain intervals of storage time the units were removed from the bath, cooled in ice water, sampled, preheated, and returned to 150° F. storage. The amount of gum was determined for each of the samples and the results tabulated below in Table II.

Table II

| Storage Time, Hours at 150° F. | Base fuel inhibited with 0.0038 percent by weight 2,4,6-tri-(dimethylaminomethyl) phenol | Base fuel, uninhibited |
|---|---|---|
| | Gum Content, mg./100 ml. | |
| 0 | 3.0 | 4.0 |
| 18 | 4.6 | 5.0 |
| 41 | 5.0 | 6.8 |
| 113 | 5.1 | 27.0 |
| 285 | 24.7 | 257.0 |

The gum content in each of the above samples was determined in accordance with A. S. T. M. Test D381–50. Briefly, this test comprises evaporating the sample to dryness under stream of preheated air at approximately 320° F. The gum is the amount of non-volatile residue expressed as milligrams per 100 milliliters of sample, present in the gasoline as received for test.

It will be noted from Table II that at the end of the accelerated test period of 285 hours at storage temperature of 150° F. the amount of gum formed in the uninhibited gasoline was more than ten times as much as that formed in the gasoline to which 2,4,6-tri-(dimethylaminomethyl) phenol was added. Whereas only 19.6 milligrams of gum/100 milliliters of gasoline were formed in the last 172 hours of the test in the inhibited sample, 230 milligrams of gum/100 milliliters of gasoline were formed in the like period in the uninhibited sample.

The data obtained in Table II are plotted in the accompanying drawing which is hereby incorporated in and made a part of this specification. In the drawing the storage time, hours at 150° F., is plotted as the abscissa and the gum content, expressed as milligrams per 100 milliliters of gasoline, is plotted as the ordinate. By extrapolating these data taken from the gum-time curves to bulk storage at 85° F. by the method of E. L. Walters et al., described in the article "Practical test for estimating storage stability of gasolines" to be found in Analytical Chemistry, 19, pages 987–991 (1947), it is found that the gasoline blends would remain suitable for use, i. e., not to exceed 10 milligrams of existent gum/100 milliliters of gasoline, for the following times:

Table III

| Blend | Bulk Storage Time at 85° F. to reach 10 mg. Gum/100 ml. gasoline, months |
|---|---|
| Uninhibited | 7.5 |
| Inhibited with 0.0038 per cent by weight of 2,4,6-tri-(dimethylaminomethyl) phenol | 22.0 |

Thus, whereas the uninhibited gasoline in the above example may be stored at 85° F. for only 7.5 months before 10 milligrams of gum/100 milliliters of gasoline are formed, the gasoline inhibited with 0.0038 per cent by weight of 2,4,6-tri-(dimethylaminomethyl) phenol may be safely stored at 85° F. for 22 months, nearly three times as long as the uninhibited gasoline, before 10 milligrams of gum/100 milliliters of gasoline are formed.

I may add 2,4,6-tri-(dimethylaminomethyl) phenol to gasoline for the purpose specified either alone or in conjunction with other additives normally added to gasolines, such as tetraethyl lead or corrosion inhibitors, without adversely affecting the desirable properties of 2,4,6 - tri-(dimethylaminomethyl) phenol or such other additives.

I claim:

1. A motor fuel comprising a gasoline of the type normally tending to deposit gum during storage or use having incoroported therein 2,4,6 - tri-(dimethylaminomethyl) phenol in an amount sufficient to inhibit the formation of gum.

2. A motor fuel as in claim 1 in which the amount of 2,4,6-tri-(dimethylaminomethyl) phenol present is at least about 0.001 per cent by weight.

3. A motor fuel comprising a gasoline of the type normally tending to deposit gum during storage or use having incorporated therein about 0.001 to about 0.07 per cent by weight of 2,4,6-tri-(dimethylaminomethyl) phenol.

References Cited in the file of this patent
UNITED STATES PATENTS

| | | |
|---|---|---|
| 2,220,834 | Bruson et al. | Nov. 5, 1940 |
| 2,453,850 | Mikeska et al. | Nov. 16, 1948 |
| 2,533,989 | Berrbower et al. | Dec. 12, 1950 |
| 2,696,427 | Biswell | Dec. 7, 1954 |